Patented Oct. 28, 1930

1,779,654

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

PROCESS OF MAKING POLYVALENT METALLIC SALTS OF HALF ESTERS OF PHTHALIC ACID

No Drawing. Original application filed June 13, 1928, Serial No. 285,225. Divided and this application filed July 8, 1929. Serial No. 376,858.

My invention relates to an improved method of preparing polyvalent metallic salts of half esters of phthalic acid. More particularly, my invention relates to a method of preparing compounds of this type which are soluble in solvents immiscible in water.

In Canadian Patent 260,927 of May 8, 1926, Bruce K. Brown and Charles Bogin have disclosed the use of certain "metal alky resins" as components of nitrocellulose lacquer adapted to partly or completely replace varnish gums. United States Serial Nos. 253,210 and 253,211, filed February 9, 1928, by C. W. Simms, W. J. Bannister and L. C. Swallen, describe the use of these materials for the purpose of facilitating the grinding of pigments. They are also useful for various other purposes.

These "metal alkyl resins" are more properly described as polyvalent metallic salts of alkyl half esters of phthalic acid. Their structure may be expressed by the following type formula:

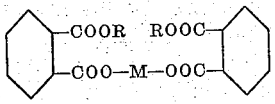

in which M represents a divalent metal, and R an alkyl group such as methyl, ethyl, propyl, butyl, etc., or an aryl group such as phenyl, tolyl, benzyl, or cinnamyl. In place of M, polyvalent metals such as zinc, copper, lead, iron, aluminium, manganese, nickel, cobalt, etc., may be substituted.

Altho there are naturally some exceptions to the general statement, the polyvalent metallic salts of half esters of phthalic acid may be generally characterized as solid, stable, neutral, resin-like substances, insoluble in water, soluble in organic solvents, and exerting a solvent action on nitrocellulose. The zinc and iron butyl phthalates are plastic solids similar to certain resins in some of their physical properties, the zinc compound being colorless and the iron, reddish-brown. The corresponding copper compound is a dry powder, bluish-green in color.

In the past it has been the custom to prepare polyvalent metallic salts of half esters of phthalic acid according to the method described below for obtaining zinc butyl phthalate.

Monobutyl phthalate was first prepared by heating phthalic anhydride with an excess of butyl alcohol. If only a slight excess of butyl alcohol was employed, the resulting compound was used as formed. If, however, a large excess was used, the monobutyl phthalate was generally crystallized out of the solution.

Sodium butyl phthalate was next formed by neutralizing the monobutyl phthalate with sodium hydroxide in aqueous solution. An aqueous solution of some soluble zinc salt was then added in equivalent proportions, with rapid agitation.

The zinc butyl phthalate obtained in this manner formed as a very sticky semi-liquid which slowly settled to the bottom of the reaction vessel. It was later dissolved in some suitable solvent and purified by dehydration and filtration. Dehydration was accomplished by choosing a solvent forming a constant boiling mixture, and distilling. The yields thus obtained were low due to inclusion of the soluble zinc compound and also of sodium butyl phthalate solution by the pasty zinc butyl phthalate. There was also an appreciable amount lost thru solution in the water. In general, many difficulties were experienced in this method of preparation due to the sticky nature of the compound.

I have now discovered a method of effecting the preparation of these compounds in the presence of water-immiscible solvents which gives greatly improved results over methods previously employed. By my new method, it is possible, if desired, to omit one step in the procedure customarily employed. The following examples are cited as illustrative of my new process.

Example I 1630 grams of phthalic anhydride is added in several portions to a mixture of 825 grams of butyl alcohol and 1000 grams of toluol, maintained at a temperature of approximately 100° C. After a homogeneous solution results, the heating is continued at this temperature for approximately 1 hour. This operation gives monobutyl phthalate. After cooling, a 10% sodium hydroxide solution, made up by dissolving 450 grams of 95% sodium hydroxide in 3600 c. c. of water, is added to the monobutyl phthalate-toluol solution until the latter is just alkaline to phenolphthalein. The temperature should be kept below 60°-70° C., and preferably below 50° C., and the mass well agitated while the sodium hydroxide is being added. A solution of 1600 grams of zinc sulphate ($ZnSO_4.7H_2O$) in 2 liters of water is next added under good agitation and the mixture allowed to settle in a separating funnel. In this manner, zinc butyl phthalate is obtained from the previously formed sodium butyl phthalate. After separation of the oil and water layers, the former is placed in a flask and distillation under reduced pressure (100 mm. or less) started. This is continued until no more water comes over with the toluol. If there is a large amount of water present, more toluol may be added to the flask. It is important that during this operation the temperature of the liquid in the flask should not exceed approximately 80° C. After cooling, any residual zinc sulphate or sodium sulphate present in the compound may be removed by filtration.

As previously pointed out, it is possible, if desired, to omit in my new process the step involving the preparation of the monovalent alkyl phthalate (e. g., sodium butyl phthalate). This point is illustrated in Example II described below.

*Example II*

Monobutyl phthalate is obtained as described in Example I by the interaction of 90 lbs. of phthalic anhydride and 55 lbs. of butyl alcohol in the presence of, say 300 lbs. of a petroleum hydrocarbon boiling above 100° C. The resulting solution is cooled to approximately 80° C. and 25.5 lbs. of powdered zinc oxide slowly added while agitating and maintaining the temperature approximately constant. It is desirable to use moist zinc oxide or else add a small amount of water, say 4 to 5 lbs. before the addition of the zinc oxide, since the presence of a small amount of water has been found to expedite the reaction. After all of the zinc oxide has been added, agitation is continued for about one hour while still maintaining the temperature at 70°-80° C. At the end of this time, the solution is tested for acidity by titrating with standard alkali solution, using brom cresol purple as the indicator. If the acidity is found to be greater than 0.1% (calculated as phthalic acid), approximately 1 lb. more of zinc oxide is added and the reacting mixture maintained at 70°-80° C. for an additional half-hour. When the acidity is found to be reduced sufficiently, the reaction kettle is closed and the reaction mixture heated for 1 hour under 25" vacuum at 80° C. When all of the water present has been removed, the reaction product is allowed to cool. After standing for 3 to 6 days it is filtered to remove unused zinc oxide, zinc phthalate, etc. Petroleum hydrocarbon or other solvent may be removed by distillation, if desired.

If desired, a solvent boiling below 100° C. may be employed in place of one boiling above 100° C., as specified above. If a low boiling solvent is employed, however, it is necessary to conduct the reaction in a closed vessel to prevent the loss of the solvent. In an alternative method of carrying out my new process, somewhat lower boiling solvents may be employed. In this case the addition of the solvent material is omitted until after the first step, e. g., the preparation of monobutyl phthalate, has been completed. As soon as this part of the reaction is over the solvent may be added and the operation completed as previously described, the desired advantages being obtained by the presence of the solvent during the latter steps.

It is distinctly understood that the examples described above are cited as illustrations of acceptable variations in my new method of preparing polyvalent metallic salts of half esters of phthalic acid and that many other similar products may be obtained in the same manner merely by suitably varying the constituents entering into the reaction. For example, in place of butyl alcohol, I may employ any other alcohol such as methyl, ethyl, propyl, amyl, benzyl, cinnamyl, etc. Instead of a zinc compound, I may use a suitable compound of such polyvalent metals as iron, lead, copper, nickel, cobalt, aluminium, etc. As the solvent required in the process, I may employ any material of suitable boiling point which is a good solvent for the polyvalent metallic salt of the half ester of phthalic acid being formed, provided it is immiscible with water and does not readily enter into reaction with any of the other materials present under the conditions of the reaction. The character of the solvent to be employed depends also upon whether or not it is desired to separate it from the final product being prepared. Examples of suitable solvents for use in my processes are: coal tar hydrocarbons, petroleum hydrocarbons, and if it is not desired to separate the resulting compound, such solvents as dibutyl phthalate and butyl stearate.

As pointed out above, it has formerly been the custom to prepare polyvalent metallic salts of half esters of phthalic acid by carrying out the various steps of the process in the presence of water and eventually attempting the recovery of the finished product by means of various solvents. This method of procedure led to many difficulties and gave poor yields. By my new process of effecting the formation of these materials in the presence of water-immiscible solvents into which they pass in solution as formed, the difficulties formerly experienced are entirely overcome and at the same time better yields and a better grade of products are obtained.

This application is a division of my co-pending application U. S. Serial No. 285,225, filed June 13, 1928, for "process of making polyvalent metallic salts of half esters of phthalic acid".

Now having described my invention, what I claim as new and novel is:

1. The process of preparing polyvalent metallic salts of half esters of phthalic acid which comprises reacting alcohols and phthalic anhydride in the presence of solvents immiscible in water and not entering appreciably into reaction with any of the materials present, neutralizing the resulting product with a moist base of a polyvalent metal, and finally recovering the said polyvalent salts of half esters of phthalic acid from the said solvents.

2. The process of preparing polyvalent metallic salts of half esters of phthalic acid which comprises reacting alcohols and phthalic anhydride in the presence of coal tar hydrocarbons, neutralizing the resulting product with a moist base of a polyvalent metal, and finally recovering the said polyvalent salt of half esters of phthalic acid from the said coal tar hydrocarbons.

3. The process of preparing polyvalent metallic salts of half esters of phthalic acid which comprises reacting phenols and phthalic anhydride in the presence of coal tar hydrocarbons, neutralizing the resulting product with a moist base of a polyvalent metal, and finally recovering the said polyvalent salt of half esters of phthalic acid from the said coal tar hydrocarbon.

4. The process of preparing polyvalent metallic salts of half esters of phthalic acid which comprises reacting alcohols and phthalic anhydride in the presence of petroleum hydrocarbons, neutralizing the resulting product with a moist base of a polyvalent metal, and finally recovering the said polyvalent salts of half esters of phthalic acid from the said petroleum hydrocarbons.

5. The process of preparing polyvalent metallic salts of alkyl half esters of phthalic acid which comprises reacting aliphatic alcohols and phthalic anhydride, adding a petroleum hydrocarbon, neutralizing the resulting product with a moist base of a polyvalent metal, and finally recovering the said polyvalent salts of alkyl half esters of phthalic acid from the said petroleum hydrocarbon.

6. The process of preparing the zinc salt of the butyl half ester of phthalic acid which comprises reacting butyl alcohol and phthalic anhydride in the presence of solvents immiscible in water and not entering appreciably into reaction with any of the materials present, neutralizing the resulting product with moist zinc oxide, and finally recovering the said zinc salt of the butyl half ester of phthalic acid.

7. The process of preparing the zinc salt of the butyl half ester of phthalic acid which comprises reacting butyl alcohol and phthalic anhydride in the presence of coal tar hydrocarbons, neutralizing the resulting product with most zinc oxide, and finally recovering the said zinc salt of the butyl half ester of phthalic acid.

8. The process of preparing the zinc salt of the butyl half ester of phthalic acid which comprises reacting butyl alcohol and phthalic anhydride in the presence of petroleum hydrocarbons, neutralizing the resulting product with moist zinc oxide, and finally recovering the said zinc salt of the butyl half ester of phthalic acid.

9. The process of preparing the zinc salt of the butyl half ester of phthalic acid which comprises reacting butyl alcohol and phthalic anhydride, adding a petroleum hydrocarbon, neutralizing the resulting product with moist zinc oxide and finally recovering the said zinc salt of the butyl half ester of phthalic acid.

In testimony whereof I affix my signature.

WILLIAM J. BANNISTER.